United States Patent [19]

Graiver et al.

[11] Patent Number: 4,572,917
[45] Date of Patent: Feb. 25, 1986

[54] SILICONE WEAR BASE ELASTOMERIC FOAM

[75] Inventors: Daniel Graiver, Midland; Robert E. Kalinowski, Auburn, both of Mich.

[73] Assignee: Dow Corning Corporation, Midland, Mich.

[21] Appl. No.: 665,224

[22] Filed: Oct. 26, 1984

[51] Int. Cl.⁴ ............................................... C08J 9/30
[52] U.S. Cl. ....................................... 521/68; 521/65; 521/91; 521/122; 521/154
[58] Field of Search ............... 521/122, 154, 68, 65, 521/91

[56] References Cited

U.S. PATENT DOCUMENTS

| | | | |
|---|---|---|---|
| 2,809,174 | 10/1957 | Dereniuk | 521/68 |
| 2,819,994 | 1/1958 | Gregory | 521/68 |
| 3,311,115 | 3/1967 | Mueller et al. | 131/266 |
| 3,425,967 | 2/1969 | Modic | 521/119 |
| 3,530,079 | 9/1970 | Iwasyk et al. | 521/68 |
| 4,189,545 | 2/1980 | Modic | 521/131 |
| 4,447,560 | 5/1984 | Piersol | 521/68 |
| 4,460,713 | 7/1984 | Lee et al. | 521/122 |
| 4,473,667 | 9/1984 | Sands | 521/122 |

*Primary Examiner*—Morton Foelak
*Attorney, Agent, or Firm*—Edward C. Elliott

[57] ABSTRACT

A method of manufacturing a fiber reinforced silicone foam is described. An aqueous silicone emulsion that cures upon drying at ambient temperature to an elastomeric film is combined with inorganic fibers having a diameter of less than 25 micrometers and a length of less than 10 mm to form a mixture. Air is dispersed through the mixture to form a stable froth. Removing the water from the stable froth yields an open-cell foam having cell walls comprising a thin layer of silicone elastomer reinforced with fibers. If electrically conductive fibers are used, the foam can be electrically conductive.

23 Claims, No Drawings

SILICONE WEAR BASE ELASTOMERIC FOAM

BACKGROUND OF THE INVENTION

1. Field of the Invention

This invention relates to elastomeric foam formed from aqueous silicone emulsion which contains inorganic fibers.

2. Background Information

Mueller et al. in U.S. Pat. No. 3,311,115, issued March 28, 1967, describe an isotropic, porous cellular foamed fibrous structure, useful in the filtration of aerosol suspensions; i.e., a cigarette filter. Their structure is formed by preparing a slurry of fibrillated cellulosic fibers, then treating them with wet strength resin and compatible latex binder. The slurry is then foamed and cast into desired filter shapes and dried to result in the breaking of the foam, leaving fibers bound together with from about 1 to 20 percent by weight of coagulated latex in an isotropic, cellular fibrous structure.

Modic, in U.S. Pat. No. 3,425,967, issued Feb. 4, 1969, teaches a foamable organopolysiloxane composition and the flexible foams produced from the compositions. His foams contain a vinyl chain-stopped diorganopolysiloxane, a vinyl containing resinous copolymer, a liquid organohydrogenpolysiloxane, and a platinum catalyst to form a curable silicone elastomer. The composition also contains a blowing agent to form the foam, an inorganic fibrous material selected from the class consisting of asbestos and fibrous potassium titanate, and optionally, a finely divided inorganic filler. The inorganic fibrous material is stated to result in a foamed product having increased strength and unexpectedly adds strength to the product resulting from the severe burning of the cured silicone foam. The compositions are converted to foam by heating the entire mixture of ingredients to an elevated temperature, such as 80° to 180° C.

Modic, in U.S. Pat. No. 4,189,545, issued Feb. 19, 1980, teaches a silicone foam comprising a vinyl-containing polysiloxane, optionally a filler, water, a hydrogen-containing polysiloxane, and a platinum catalyst. The ingredients react upon mixing to liberate hydrogen and form a foam which cures to a silicone elastomeric foam. Among the optional fillers suggested is glass fibers along with other extending filler such as carbon, calcium carbonate, and ground quartz.

Sands, in U.S. Pat. No. 4,473,667, issued Sept. 25, 1984, discloses a method of producing a silicone elastomeric foam from an aqueous silicone emulsion suitable to provide an elastomeric product upon removal of the water. He mechanically generates a stable froth, then removes the water to form cured elastomeric foam. He stabilizes the froth with the proper use of surfactant and thickener.

SUMMARY OF THE INVENTION

A method of preparing an open cell, silicone elastomeric foam having the foam cell walls reinforced with fibers has been discovered. A mixture is prepared by mixing an aqueous, oil-in-water emulsion of silicone elastomer, that cures upon removal of the water at ambient temperature to an elastomeric film, with inorganic fibers that have a diameter of less than 25 micrometers and a length of less than 10 millimeters with the ratio of length to diameter of at least 10:1. Dispersing air throughout the mixture forms a froth. The froth is then dried to remove the water, yielding a foam having cell walls reinforced with the fibers.

The foam has increased toughness when compared to a foam made without the fibers.

If electrically conductive fibers are used, the resulting foam can be made electrically conductive.

DESCRIPTION OF THE INVENTION

This invention relates to a method of preparing a silicone foam consisting essentially of (A) combining, at atmospheric pressure, ingredients selected from the group consisting essentially of (1) sufficient silicone emulsion to provide 100 parts by weight of dispersed silicone polymer, said silicone emulsion being present as an aqueous, oil-in-water emulsion that cures upon drying at ambient temperature to an elastomeric film, the emulsion comprising silicone polymer, surfactant, water, and optionally filler, curing agent, and thickener, the emulsion having a solids content of from 35 to 80 percent by weight; and (2) from 5 to 50 parts by weight of inorganic fibers having a diameter of less than 25 micrometers and a length of less than 10 millimeters with the ratio of length to diameter of greater than 10:1 to form a mixture, the mixture being a stable emulsion able to form a stable froth in step (B); then (B) dispersing air throughout the mixture to create a stable froth, at the same time dispersing the fibers throughout the froth; then (C) removing the water from the stable froth, to yield an open-cell foam having the walls of the foam cells comprising a thin layer of silicone elastomer reinforced with fibers.

A variety of methods have been discovered for making aqueous emulsions of silicone elastomers. Many of these emulsions yield silicone elastomers by merely removing the water from the emulsion at ambient temperatures. Methods have also been discovered for producing a froth from such emulsions which is stable enough to yield a foam when the water is removed from the froth. The method of this invention yields an improved foam in that the cell walls of the foam are reinforced with inorganic fibers. It has unexpectedly been found that the use of the fibers also results in a lower density foam than is produced when the fibers are not used.

An electrically conductive foam can be produced by using electrically conductive fibers in the manufacture of the foam. Because the electrical conductivity of the foam varies with the amount of pressure applied, the electrically conductive foam can be used in pressure measuring devices and as electronic switches.

The emulsion used as (1) of this invention is an emulsion which contains a dispersed phase of elastomer. The emulsion, when dried at ambient temperature, yields an elastomer. The emulsion particles are present in the aqueous, oil-in-water emulsion as crosslinked particles while the water is still present. Inter-particle crosslinks occur during the drying or curing of the emulsion upon the removal of the water from the emulsion.

Emulsion (1) can also contain a material, selected from the group comprising colloidal silica, alkali metal silicate, and organosilicate dispersed in the continuous water phase. This material provides reinforcement for the dried elastic product and/or participates in the crosslinking of the elastomer. The exact function of this material is discussed further in the discussion below on different species of silicone emulsion useful in this invention.

The fibers used in the method of this invention are inorganic fibers which are not adversely effected by the aqueous emulsion, many of which are alkaline. The fibers have a diameter of less than 25 micrometers and a length of less than 10 millimeters so that they can be dispersed throughout the emulsion. It is preferred that the fibers have a diameter of less than 10 micrometers and a length of less than 5 millimeters. The smaller the diameter of the fibers and the shorter they are, the more easily and uniformly they can be dispersed in the emulsion. Preferred are glass fibers having a diameter of less than 5 micrometers and a length of 1 millimeter or less. Glass fibers having a diameter of about 3 micrometers and a length of about 1 mm have been found to function very well. The minimum diameter of useful fibers is about 1 micrometer and the minimum length of useful fibers is about 20 micrometers. The reinforcing fibers are fibrous rather than just a small particle filler because the length of the fibers must be at least 10 times their diameter.

The fibers used in the method of this invention serve at least two different functions. The fibers serve to act as reinforcement in the cell walls of the foam to give a tougher foam. The fibers also act to produce a more stable froth when air is dispersed into the mixture of aqueous emulsion and fibers. A more stable froth allows more air to be mixed into the emulsion to give a less dense froth. The fibers also stabilize the froth so that the froth does not shrink or collapse during the period after the froth is formed while the water is being removed.

If the fibers are electrically conductive, the resulting foam can be electrically conductive. Electrically conductive graphite fibers and graphite fibers coated with nickel have been found useful. Graphite fibers coated with other metals not effected by the emulsion, such as silver and gold, are also useful. Nickel-coated graphite fibers which are sized with a silane are easier to disperse in the emulsion (1). Stainless steel fibers having a diameter of about 4 to 20 micrometers and a length of about 1 to 5 mm are more difficult to properly disperse in the emulsion. The ductile stainless steel fibers clump up together during mixing while the more brittle glass or graphite fibers tend to break rather than clump together during mixing. The stainless steel fibers do not produce as electrically conductive a foam as do the graphite fibers coated with nickel.

Mixtures of various fibers or mixtures of fibers and other types of particulate fillers can also be used. Useful particulate fillers would include those known to be useful in aqueous silicone emulsions, such as glass spheres, metal coated glass spheres, silica, calcium carbonate, ground quartz, carbon black, and metal oxides.

The emulsions (1) used in this invention have been found to be uniquely useful. Because the dispersed elastomer particles of the emulsion are crosslinked before the fibers are added, the fibers remain dispersed in the continuous phase of the emulsion and do not become a part of the dispersed polymer particles. As the emulsion is dried, the dispersed polymer particles and the dispersed fibers are brought closer and closer together. In the dried film, it is believed that the fibers are found in random contact with each other with the crosslinked polymer particles occupying the space between them; the crosslinked polymer particles being bound to each other through a solid continuous polar phase. The result of this unique morphology of the dried product is an unusually efficient use of the fibers to reinforce the cell walls of the final foam.

The emulsion, (1), is an aqueous emulsion having a dispersed elastomer with a continuous phase of water which cures upon drying at ambient temperatures to an elastomeric film.

Preferred emulsions for (1) are silicone emulsions, that is, emulsions in which the elastomer is based upon polydiorganosiloxane. A silicone emulsion having a dispersed phase of an anionically stabilized hydroxylated polydiorganosiloxane and a colloidal silica and a continuous phase of water in which the pH is 9 to 11.5 as described in U.S. Pat. No. 4,221,688, issued Sept. 9, 1980, to Johnson et al. is a preferred emulsion for use in this invention as (1). U.S. Pat. No. 4,221,688 is hereby incorporated by reference to disclose the emulsion and method of manufacture of such an emulsion. Hydroxylated polydiorganosiloxanes are those which impart elastomeric property to the product obtained after removal of the water from the emulsion. They should have a weight average molecular weight of at least 5,000, preferably in a range of 200,000 to 700,000. The organic radicals of the hydroxylated polydiorganosiloxane can be monovalent hydrocarbon radicals containing less than seven carbon atoms per radical and 2-(perfluoroalkyl)ethyl radicals containing less than seven carbon atoms per radical. The hydroxylated polydiorganosiloxanes preferably contain at least 50 percent methyl radicals with polydimethylsiloxane being preferred. The hydroxylated polydiorganosiloxanes are preferably those which contain about 2 silicon-bonded hydroxyl radicals per molecule.

The most preferred hydroxylated polydiorganosiloxanes are those prepared by the method of anionic emulsion polymerization described by Findley et al. in the U.S. Pat. No. 3,294,725 which is hereby incorporated by reference to show the methods of polymerization and to show the hydroxylated polydiorganosiloxane in emulsion. Another method of preparing hydroxylated polydiorganosiloxane is described by Hyde et al. in U.S. Pat. No. 2,891,920 which is hereby incorporated by reference to show the hydroxylated polydiorganosiloxanes and their method of preparation.

The emulsion of U.S. Pat. No. 4,221,688, cited above, requires colloidal silica as an ingredient. Any of the colloidal silicas can be used, the preferred colloidal silicas are those which are available in an aqueous medium. Aqueous colloidal silicas which have been stabilized with sodium ion are particularly useful because the pH requirement can be met by using such a sodium stabilized colloidal silica without having to add additional ingredients to bring the pH within the 9 to 11.5 range. The preferred amount of colloidal silica is from 1 to 25 parts by weight for each 100 parts by weight of polydiorganosiloxane.

The emulsion of U.S. Pat. No. 4,221,688 cited above makes use of an organic tin compound, preferably a diorganotindicarboxylate to reduce the storage time between the preparation of the emulsion and the time an elastomeric product can be obtained from the silicone emulsion by removal of the water under ambient conditions to an acceptable range of one to three days. The diorganotindicarboxylate can be used in amounts of from 0.1 to 2 parts by weight for each 100 parts by weight of the polydimethylsiloxane. The preferred diorganotindicarboxylate is dioctyltindilaurate.

The emulsion of U.S. Pat. No. 4,221,688, cited above is prepared by a method consisting essentially of emulsifying a hydroxylated polydiorganosiloxane which contains about 2 silicon-bonded hydroxyl radicals per molecule using an anionic surfactant and water, adding a colloidal silica and an organic tin compound and adjusting the pH of the resulting emulsion to a range from 9 to 11.5 inclusive.

Another emulsion useful as (1) of this invention is described in U.S. Pat. No. 4,244,849, issued Jan. 13, 1981, to Saam, hereby incorporated by reference to disclose the emulsion and method of manufacture of such an emulsion. This emulsion comprises a continuous water phase and an anionically stabilized dispersed silicone phase which is a graft copolymer of a hydroxyl endblocked polydiorganosiloxane and an alkali metal silicate which is present in the continuous water phase. The emulsion has a pH within the range from 8.5 to 12 inclusive. The hydroxyl endblocked polydiorganosiloxane useful in this embodiment is the same as that described above. The alkali metal silicates that are suitable are water soluble silicates, preferably employed as an aqueous solution. Preferred is sodium silicate in an amount of from 0.3 to 30 parts by weight for each 100 parts by weight of polydiorganosiloxane. During the preparation of the emulsion an organic tin salt is added to catalyze the reaction of the hydroxyl endblocked polydiorganosiloxane and the alkali metal silicate. A diorganotindicarboxylate is a preferred organic tin salt with from 0.1 to 2 parts by weight employed for each 100 parts by weight of polydiorganosiloxane. The preferred diorganotindicarboxylate is dioctyltindilaurate.

These emulsions are preferably prepared by mixing together an anionically stabilized aqueous emulsion of hydroxyl endblocked polydiorganosiloxane, aqueous solution of alkali metal silicate, and organic tin salt in an emulsion so that all the ingredients are initially present as dispersed particles in water. The pH of the emulsion is adjusted to a range of from 8.5 to 12 inclusive if necessary. Upon aging, the silicate and polydiorganosiloxane form a graft copolymer of dispersed particles in which the polydiorganosiloxane becomes crosslinked. If the emulsion is dried, an elastomer is formed.

Another emulsion useful as (1) of this invention is described in U.S. Pat. No. 4,248,751, issued Feb. 3, 1981, to Willing, hereby incorporated by reference to disclose the emulsion and its method of manufacture. For use in this invention, the emulsion includes the addition of colloidal silica. This emulsion is the emulsion produced by a process comprising emulsifying (f) a vinyl endblocked polydiorganosiloxane and (g) an organosilicon compound having silicon-bonded hydrogen atoms using water and surfactant to form an emulsion, adding a platinum catalyst and heating the emulsion to form a dispersed phase of crosslinked silicone elastomer, then adding colloidal silica. The vinyl endblocked polydiorganosiloxane (f) preferably is a polydiorganosiloxane terminated by triorganosiloxy groups and having two vinyl radicals per molecule, no silicon atom having more than one vinyl radical bonded thereto. The remaining organic radicals are preferably those with six carbon atoms or less with the preferred organic radicals being selected from the group consisting of methyl, ethyl, phenyl, and 3,3,3-trifluoropropyl radicals, at least 50 percent of the radicals being methyl radicals. The polydiorganosiloxane should have a viscosity of from 0.1 to 100 Pa·s at 25° C.

In this embodiment, the organosilicon compound (g) is one which contains silicon-bonded hydrogen atoms. This compound can be any compound or combination of compounds containing silicon-bonded hydrogen atoms useful as crosslinkers and providing an average of silicon-bonded hydrogen atoms per molecule of (g) of at least 2.1. Such compounds are known in the art as illustrated in U.S. Pat. No. 3,697,473, issued Oct. 10, 1972 to Polmanteer et al., which is hereby incorporated by reference to show such organosilicon compounds. A preferred organo-silicon compound is a mixture which consists essentially of (a) an organosiloxane compound containing two silicon-bonded hydrogen atoms per molecule and the organic radicals being selected from the group consisting of alkyl radicals having from 1 to 12 carbon atoms inclusive, phenyl, and 3,3,3-trifluoropropyl radicals, no silicon atom having bonded thereto more than one silicon-bonded hydrogen atom, and said organosiloxane (a) having no more than 500 silicon atoms per molecule, and (b) an organosiloxane compound containing at least 3 silicon-bonded hydrogen atoms per molecule, the organic radicals being selected from the group defined above for R', no silicon atom having bonded thereto more than one silicon-bonded hydrogen atom and said organosiloxane compound (b) having no more than 75 silicon atoms per molecule. This mixture is such that at least 10 percent of the silicon-bonded hydrogen atoms are derived from (a) or (b) and the combination of (a) and (b) provides 100 weight percent of the mixture. The organosilicon compound is preferably added in an amount such that there are present from 0.75 to 1.50 silicon-bonded hydrogen atoms in the compound (g) for each vinyl radical in the vinyl endblocked polydiorganosiloxane (f).

The emulsion of this embodiment is produced by emulsifying polydiorganosiloxane (f) and organosiloxane compound (g) in water and a surfactant as shown in U.S. Pat. No. 4,248,751, cited above. A preferred method is that shown in U.S. Pat. No. 3,294,725 cited above which shows the method of polymerization and the anionic emulsifying agents or surfactants which can be used in this embodiment. After the emulsion of (f) and (g) has been made, a platinum catalyst is added. The emulsion is then heated to form a dispersed phase of crosslinked silicone elastomer as the ingredients (f) and (g) react in the presence of the platinum catalyst. After the crosslinked polymer is formed, colloidal silica is added to the emulsion, preferably in the form of an aqueous dispersion of a colloidal silica. The amount of colloidal silica is not critical, up to 70 parts by weight can be added with about 25 parts by weight of silica per 100 parts by weight of elastomer being preferred. If the emulsion is dried, the product is a dispersed phase of crosslinked elastomer in a solid polar continuous phase formed by the colloidal silica.

Another emulsion useful in (1) of this invention is described in U.S. Pat. No. 4,273,634, issued June 16, 1981, to Saam et al. which is hereby incorporated by reference to show the emulsion and method of manufacture of an emulsion useful in this invention when colloidal silica is also present in the emulsion. The emulsion of this embodiment comprises an emulsion prepared by first forming a stabilized dispersion of hydroxyl endblocked polydiorganosiloxane containing sufficient vinyl substituted siloxane units to facilitate the crosslinking of the polydiorganosiloxane and having a weight average molecular weight of at least 5000. The preferred weight average molecular weight is in the range of from 200,000 to 700,000. The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. It is preferred that at least 50 percent of the radicals are methyl radicals with a preferred polydiorganosiloxane being a copolymer containing dimethylsiloxane units and methylvinylsiloxane units. The amount of vinyl-substituted siloxane units is not critical, typically about 0.03 to 0.06 mole percent of the vinyl-substituted siloxane units are preferred.

A preferred method of forming the stabilized dispersion is to prepare the polydiorganosiloxane by emulsion polymerization, preferably by the method of U.S. Pat. No. 3,294,725 cited above.

After the dispersion of hydroxyl endblocked polydiorganosiloxane containing vinyl substituted siloxane units has been made, it is treated to provide a crosslinking action by forming free radicals within the dispersed polydiorganosiloxane. Any of the methods known in the art to produce free radicals that will crosslink the polydiorganosiloxane can be employed in the present invention as long as the free radicals can be generated within the dispersed particles without breaking or coagulating the dispersion. Generally, crosslink-inducing radicals can be produced by energy activation of the polydiorganosiloxane directly or by energy activation of radical-producing agents dissolved in the droplets.

A method of producing radicals by energy activation of the dispersed polydiorganosiloxane directly is to expose the dispersion to high energy radiation as by exposure to gamma radiation until crosslinking takes place. Another method is by energy activation of a radical-producing agent which is dissolved in the silicone particles of the dispersion. A preferred radical producing agent includes any of the well-known organic peroxides which are suitable for vulcanizing silicone rubber. The radical-producing agent is dissolved in the emulsion and then the emulsion is heated to the elevated temperature at which the agent produces radicals so that the polydiorganosiloxane is crosslinked.

After the polydiorganosiloxane in the emulsion is crosslinked, colloidal silica is added to the emulsion, preferably in the form of an aqueous dispersion of colloidal silica. The amount of colloidal silica is not critical, up to 70 parts by weight can be added with a preferred amount from about 10 to 25 parts by weight of colloidal silica per 100 parts by weight of polydiorganosiloxane.

Another emulsion useful in (1) of this invention is described in the patent application, Ser. No. 624,545, titled "Polydiorganosiloxane Latex", by Huebner and Saam, filed on June 26, 1984, and having the same assignee, which is hereby incorporated by reference to describe the emulsion and its method of manufacture. In this method of producing an aqueous emulsion of crosslinked polydiorganosiloxane, a hydroxyl endblocked polydiorganosiloxane is mixed with a hydrolyzable silane having 3 or 4 hydrolyzable groups, a surface active anionic catalyst selected from the group consisting of a compound of the formula $R'C_6H_4SO_3H$ wherein $R'$ is a monovalent aliphatic hydrocarbon radical of at least 6 carbon atoms and a compound of the formula $R'OSO_2OH$ wherein $R'$ is as defined above, and sufficient water to form an oil-in-water emulsion. The mixture is immediately homogenized, then allowed to polymerize at a temperature of from about 15° to 30° C. for at least 5 hours at a pH of less than 5 until a crosslinked polymer is formed. The crosslinked polymer emulsion is then neutralized to a pH of greater than 7 and reinforced by adding greater than 1 part by weight of colloidal silica sol or silsesquioxane.

At the present time, it is thought that an aqueous, oil-in-water silicone emulsion that cures upon drying at ambient temperature to an elastomeric film can be used as the silicone emulsion of (1).

This invention first combines a silicone emulsion (1) and inorganic fibers (2) to form a mixture. The emulsion (1) can also contain other ingredients in minor amounts such as additional surfactant, emulsifying agent, thickner, filler, and pigments. The emulsion has a solids content of from 35 to 80 percent by weight. Solids content is the percent by weight of non-volatile material remaining in a 2 g sample of the emulsion after it has been heated for 1 hour at 150° C. in an air-circulating oven. The sample is in an aluminum foil dish 60 mm in diameter and 15 mm deep. The mixture is then agitated to disperse the ingredients uniformly, including the fibers, and to disperse air throughout the mixture to form a froth. The air can be dispersed by blowing air through the mixture or by stirring or mixing air into the mixture with a mixing device. For small quantities of material, the mixing and dispersing can be by hand, using a spatula for example. Stirring must be vigorous enough to whip air into the mixture and create the froth. An industrial kitchen type mixer having rotating beaters provides a good mixing action without a large amount of shear, which could cause excessive breakage of the fibers. Such a mixer also beats air into the mixture and creates a froth.

A mixer that has low shear yet thoroughly mixes the ingredients and disperses air into the mixture to create a froth has a central shaft which can be moved up and down through the mixture with perforated plates attached to the shaft that are about the same size as the container. As the plates and shaft move up and down through the mixture, the mixture flows through the perforations with turbulence, causing mixing to take place to disperse the fibers and other ingredients without subjecting the fibers to high shear forces. By adjusting the mixer so that the plates rise above the surface of the mixture, air is forced into the mixture to create a froth.

After the fibers are uniformly distributed and a uniform froth is formed, the froth is poured onto a surface to be coated or into a mold or container or space as desired. The froth is stable in that it remains as a froth after the mixing has stopped because of the nature of the emulsion and its ingredients and because of the presence of the fibers. The fibers appear to reinforce the cell walls of the froth so that a less dense froth can be formed than when the fibers are not present. The stable froth is converted to an open-cell foam by removing the water. The water is most easily removed by allowing it to evaporate under ambient conditions. It can also be removed by placing the stable froth in a hot-air oven or subjecting it to microwave energy. The fibers also reinforce the cell walls during removal of the water from the froth so that the froth does not shrink or collapse. After the froth has dried, the resulting open cell foam has cell walls reinforced with fibers. The density of the foam is lower than that of comparable foam which does not contain fiber even though the fiber is of a high density itself.

The foam produced by the method of this invention is tougher than similar foams not containing fiber. It requires less material to fill a given space. The foam is useful as a caulking material because it is tough and has good weatherability.

A special embodiment is produced by the method of this invention when the fibers used are electrically conductive. The electrically conductive foam produced from such a method can be used to seal joints where electro-magnetic shielding is required. Because the foam varies in conductivity with pressure, it can be used to design electrical switches or measuring devices based upon this principal.

The following examples are presented for purposes of illustrating the invention and should not be construed as limiting the scope of the invention which is properly delineated in the claims. Where amounts are referred to as parts or percent, the terms refer to parts by weight or percent by weight.

EXAMPLE 1

A foam prepared from a silicone emulsion polymer reinforced with glass fibers was prepared and evaluated.

An aqueous emulsion polymer was prepared by mixing 100 parts of hydroxyl endblocked polydimethylsiloxane fluid, having a viscosity of about 0.08 Pa·s at 25° C. and OH radical content of about 1.2 percent with 54 parts of water and 4.1 parts of a 30 percent aqueous dispersion of sodium lauryl sulfate. This mixture was homogenized, then mixed with 1.1 parts of dodecylbenzenesulfonic acid. After 16 hours at room temperature to allow the polymerization of the siloxane to take place, the mixture was made alkaline by adding 0.54 part of a 50 percent by weight dispersion of diethylamine in water. This is Emulsion A.

A curable emulsion, Emulsion B, was then prepared by mixing together 2520 g of the above emulsion having 60 percent polymer, 1006 g of a colloidal silica sol having 15 percent of colloidal silica, and 30 g of a 50 percent dispersion of dioctyltindilaurate in water. This curable emulsion contained 100 parts of dispersed elastomer, 10 parts of colloidal silica, 1 part of dibutyltindilaurate, and a continuous phase of 125 parts of water.

An emulsion, Emulsion C, containing glass fibers was then prepared by mixing together 300 g of the above curable Emulsion B, 25.7 g of a colloidal silica sol having a solids content of 50 percent by weight, 11.45 of an aqueous solution of an acrylic thickening agent having a solids content of 28 percent by weight, 9.46 g of a 50 percent by weight aqueous solution of sodium lauryl sulfate, and 12.84 g of glass fiber having an average diameter of about 3.2 micrometers and an average length of less than 1 mm. This gave 10 parts by weight of glass fibers per 100 parts by weight of silicone polymer. The ingredients were placed into a low shear mixer consisting of a container and a central shaft having a series of perforated plates attached to the shaft. When the shaft is moved up and down, the contents of the container flow through the perforated plates. A froth was created by moving the plates up and down through 300 strokes to thoroughly disperse the ingredients, including the glass fibers, and also force air through the mixture, forming a froth. The froth was then cast onto a polyethylene coated paper and allowed to dry.

The foam resulting from drying the froth had a density of 158 kg/m$^3$. Examination of the foam showed the walls of the foam cells consisted of a thin layer of silicone elastomer reinforced with fibers.

A comparative emulsion was prepared similar to Emulsion C, but the glass fibers were not added. This non-reinforced emulsion was frothed as above, then dried. The foam without the fibers had a density of 194 kg/m$^3$.

The fibers in the foam produced a lower density foam. The foam was stronger with less elongation than the similar foam produced without the fibers.

An emulsion was prepared as above, but contained enough of the glass fibers to give 15 parts by weight of fibers per 100 parts by weight of silicone polymer. This reinforced emulsion was frothed and then dried to give a foam as above. The foam had a density of 153 kg/m$^3$.

EXAMPLE 2

An experiment was performed to evaluate the effect of mixing time upon the resultant foam.

A sample of glass fiber containing emulsion was prepared as in Example 1, Emulsion C, containing 10 parts by weight of glass fiber. The sample was placed into the low shear mixer and mixing begun. After 700 strokes of the plates, the mixer was stopped and a sample of the froth was removed and placed in a paper cup. The mixing was continued with additional samples removed at 1000 strokes and at 1500 strokes. The froths were allowed to dry. The density of the resulting foams were:

| Mix Strokes | Density |
| --- | --- |
| 700 | 98.2 kg/m$^3$ |
| 1000 | 95.0 |
| 1500 | 106 |

EXAMPLE 3

Samples were prepared using fibers of nickel-coated graphite.

A first sample emulsion was prepared as in Example 1, Emulsion C, containing 10 parts by weight of fiber per 100 parts by weight of silicone polymer, but substituting silane sized nickel-coated graphite fibers for the glass fibers. The fibers were graphite fibers with a nominal diameter of 8 micrometers and a nickel coating of 0.5 micrometers thickness. The fibers were a nominal 3.2 mm in length. They were "Cycom" MCG fibers obtained from American Cyanamid Co.

A second sample emulsion was prepared containing 20 parts by weight of the fibers per 100 parts by weight of silicone polymer.

A third sample emulsion was prepared containing 23 parts by weight of the fibers per 100 parts by weight of silicone polymer.

Each fiber reinforced emulsion was then frothed as in Example 1 and cast and dried to yield a foam. The density and electrical conductivity of each was then measured with the results shown below.

| Sample | Parts Nickel-Graphite Fiber | Density kg/m$^3$ | Conductivity ohm/cm |
| --- | --- | --- | --- |
| 1 | 10 | 199 | 36 |
| 2 | 20 | 181 | 4.6 |
| 3 | 23 | 146 | 2.5 |

EXAMPLE 4

A curable silicone emulsion, Emulsion D, was prepared by mixing 100 parts of Emulsion A of Example 1 with 58 parts of the colloidal silica sol of Example 1, 1 part of diethylamine, 6.4 parts of an acrylic thickener, 0.3 part of the dioctyltindilaurate dispersion of Example 1 and 0.2 parts of silicon-antifoam agent. This emulsion had a solids content of about 43 percent by weight.

A fiber reinforced foam was then prepared by mixing in the low shear mixer described in Example 1, 400 g of the above Emulsion D, 12 g of the sized nickel-coated graphite fibers of Example 3 and 10 g of an 18 percent solids disodium N-octydecylsulfsuccinamate surfactant. This was 7.78 parts of fibers per 100 parts of silicone elastomer. This mixture was dispersed and frothed by 555 strokes of the mixer. A portion of the froth was poured out onto polyethylene-coated kraft paper and allowed to dry to form a foam (Foam A). The resulting resilient open-celled foam was approximately 7.6 mm thick with cells of about 1 to 2 mm diameter. This foam had a density of about 319 kg/m$^3$.

A similar fiber reinforced foam (B) was prepared as above, but adding 23.16 g of the sized nickel-coated graphite fibers (15 parts of fibers per 100 parts of silicone elastomer). The mixture was dispersed and frothed by 709 strokes of the mixer. Portions of the froth were poured out onto polyethylene-coated kraft paper and allowed to dry into foams (Foam B) of 8.4 mm and 14 mm thickness. These open-cell foams had a density of about 246 kg/m$^3$.

Because these foams were reinforced with electrically conductive fibers, the foams were electrically conductive. The electrical resistivity of the foams was measured by placing them in a guarded electrode configuration having plates of 76.2 mm × 102 mm with a 50.8 mm diameter measuring electrode in the center. The plates were in a machine that could measure and adjust the pressure applied to the surface of the foam. The pressure applied versus the volume resistivity of the foams was:

| Pressure Pa | VOLUME RESISTIVITY, ohm-cm | | |
|---|---|---|---|
| | Foam A | | Foam B |
| | 7.6 mm Thick | 8.4 mm Thick | 14 mm Thick |
| 57 | 10,500 | 82 | 133 |
| 860 | 180 | 5.6 | 25 |
| 1722 | 90 | 4.3 | 13 |
| 3445 | 105 | 3.8 | 10 |
| 5740 | 127 | 4.9 | 13 |

Repeating the test on the Foam B sample that was 14 mm thick for a second time resulted in values approximately ½ those shown above.

EXAMPLE 5

A mixture of 300 g of Emulsion D of Example 4, 7.5 g of the surfactant, 11.58 g of the sized nickel graphite fibers, and 115.8 g of glass beads coated with silver having a diameter of about 25 micrometers was mixed for 500 strokes in the mixer to disperse the ingredients and form a froth. The froth was then poured onto polyethylene-coated kraft paper and dried to form an open-celled foam of about 6.4 mm thickness having 100 parts of silver-coated glass microspheres and 10 parts of nickel-coated graphite fibers per 100 parts of silicone elastomer. The foam had a density of about 372 kg/m$^3$ and pores averaging about 2 mm in diameter.

The electrical conductivity was measured as in Example 4; the following results were obtained:

| Pressure Pa | Volume Resistivity ohm-cm |
|---|---|
| 57 | inf. |
| 860 | 3 |
| 1722 | 2.2 |
| 3445 | 1.5 |
| 5740 | 1.2 |

EXAMPLE 6

A comparative foam was prepared by mixing 404.7 g of Emulsion D of Example 4 and 4 g of the surfactant of Example 4 together in an industrial kitchen-type mixer to create a froth. The froth was poured into a container and allowed to dry to form a foam. The foam had a density of about 256 kg/m$^3$.

A similar foam was prepared by mixing 100 g of the same Emulsion D with 1.3 g of the surfactant of Example 4 and 6 g of the glass fibers of Example 1 into a froth in the mixer of Example 1. The froth, dried to a foam, had a density of about 176 kg/m$^3$. The addition of the glass fibers resulted in a lower density foam even though the fibers themselves are a much higher density than any of the other ingredients.

EXAMPLE 7

A mixture of 300 g of the curable silicone Emulsion D of Example 4, 22.2 g of stainless steel fibers having a diameter of 1 micrometer and a length of 40 micrometers and 11.6 g of stainless steel fibers having a diameter of 2 micrometers and a length of 30 micrometers were mixed together with a spatula. Then the mixture was placed in the low shear mixer described in Example 1 and frothed by 300 cycles of the mixer. The froth was poured into a container to a depth of 70 mm and allowed to dry. The foam had a density of about 173 kg/m$^3$. The electrical conductivity was measured as 8,400 ohm/cm.

That which is claimed is:

1. A method of preparing silicone foam consisting essentially of
   (A) combining, at atmospheric pressure, ingredients selected from the group consisting essentially of
      (1) sufficient silicone emulsion to provide 100 parts by weight of dispersed silicone polymer, said silicone emulsion being present as an aqueous, oil-in-water emulsion that cures upon drying at ambient temperature to an elastomeric film, the emulsion comprising silicone polymer, surfactant, water, and optionally filler, curing agent, and thickener, the emulsion having a solids content of from 35 to 80 percent by weight, and
      (2) from 5 to 50 parts by weight of inorganic fibers having a diameter of less than 25 micrometers and a length of less than 10 millimeters with the ratio of length to diameter of greater than 10:1 to form a mixture, the mixture being a stable emulsion able to form a stable froth in step (B), then
   (B) dispersing air throughout the mixture to create a stable froth, at the same time dispersing the fibers throughout the froth, then
   (C) removing the water from the stable froth, to yield an open-cell foam having the walls of the foam cells comprising a thin layer of silicone elastomer reinforced with fibers.

2. The method of claim 1 in which step (B) consists of agitating the mixture in a low shear mixer with sufficient rapidity to force air into the mixture.

3. The method of claim 1 in which (B) consists of blowing air through the mixture.

4. The method of claim 1 in which the water is removed in (C) by exposing the froth to ambient air.

5. The method of claim 1 in which the inorganic fibers have a diameter of less than 10 micrometers and a length of less than 5 millimeters.

6. The method of claim 5 in which the fibers are glass fibers having a diameter of less than 5 micrometers and a length of 1 mm or less.

7. The method of claim 1 in which the fibers are electrically conductive.

8. The method of claim 7 in which the fibers are graphite fibers having a diameter of less than 10 micrometers and a length of less than 5 millimeters.

9. The method of claim 8 in which the graphite fibers are coated with metal.

10. The method of claim 9 in which the metal-coated graphite fibers are sized with a silane.

11. The method of claim 1 in which the emulsion (1) comprises a continuous aqueous phase and a dispersed phase, the dispersed phase consisting essentially of an anionically stabilized hydroxylated polydiorganosiloxane which contains about 2 silicon-bonded hydroxyl radicals per molecule, an organic tin compound, and a colloidal silica, said silicone emulsion having a pH in a range of 9 to 11.5 inclusive.

12. The method of claim 11 in which the polydiorganosiloxane is a polydimethylsiloxane having a weight average molecular weight in a range of 200,000 to 700,000, the colloidal silica is present in a amount of from 1 to 25 parts by weight for each 100 parts by weight of polydimethylsiloxane, and the organic tin compound is a diorganotindicarboxylate present in an amount of from 0.1 to 2 parts by weight for each 100 parts by weight of the polydimethylsiloxane.

13. The method of claim 1 in which the dispersed polymer of emulsion (1) comprises a graft copolymer of alkali metal silicate and a hydroxyl endblocked polydiorganosiloxane, the silicone emulsion having a pH within the range from 8.5 to 12 inclusive.

14. The method of claim 13 which the polydiorganosiloxane is a polydimethylsiloxane having an average molecular weight in a range of 200,000 to 700,000, the alkali metal silicate is a sodium silicate employed in an amount of from 0.3 to 30 parts by weight for each 100 parts by weight of polydimethylsiloxane and there is also present an organic tin salt.

15. The method of claim 14 in which the organic tin salt is an diorganotindicarboxylate present in an amount of from 0.1 to 2 parts by weight for each 100 parts by weight of polydimethylsiloxane.

16. The method of claim 1 in which the emulsion (1) is produced by a process comprising emulsifying (f) a vinyl endblocked polydiorganosiloxane and (g) an organosilicon compound having silicon-bonded hydrogen atoms using water and surfactant to form an emulsion, adding a platinum catalyst and heating the emulsion to form a dispersed phase of crosslinked silicone elastomer, then adding colloidal silica.

17. The method of claim 16 in which the vinyl endblocked polydiorganosiloxane (f) is a polydiorganosiloxane terminated by triorganosiloxy groups having two vinyl radicals per molecule, no silicon atom having more than one vinyl radical bonded thereto, the remaining organic radicals being selected from the group consisting of methyl, ethyl, phenyl, and 3,3,3-trifluoropropyl radicals, at least 50 percent of the organic radicals being methyl radicals, and said polydiorganosiloxane having a viscosity of from 0.1 to 100 Pa·s at 25° C., and the organo-silicon compound (g) is a mixture of silicon compounds providing from 0.75 to 1.50 silicon-bonded hydrogen atoms per vinyl radical of (f), said mixture (g) consisting essentially of (a) an organosiloxane compound containing two silicon-bonded hydrogen atoms per molecule and the organic radicals being selected from the group consisting of alkyl radicals having from 1 to 12 carbon atoms inclusive, phenyl and 3,3,3-trifluoropropyl, no silicon atom having bonded thereto more than one silicon-bonded hydrogen atom, and said organosiloxane compound (a) having no more than 500 silicon atoms per molecule, and (b) an organosiloxane compound containing at least 3 silicon-bonded hydrogen atoms per molecule, the organic radicals being selected from the group consisting of alkyl radicals having from 1 to 12 carbon atoms inclusive, phenyl and 3,3,3-trifluoropropyl radicals, no silicon atom having bonded thereto more than one silicon-bonded hydrogen atom, and said organosiloxane compound (b) having no more than 75 silicone atoms per molecule, said mixture (g) being such that at least 10 percent of the silicon-bonded hydrogen atoms are derived from (a) and at least 10 percent of the silicon-bonded hydrogen atoms are derived from (b), (a) and (b) composing 100 weight percent of mixture (g).

18. The method of claim 1 in which the emulsion (1) is an emulsion prepared by first forming a stabilized dispersion of hydroxyl endblocked polydiorganosiloxane containing sufficient vinyl substituted siloxane units to facilitate the crosslinking of the polydiorganosiloxane and having a weight average molecular weight of at least 5000 and then, treating the dispersion to provide a crosslinking action by forming free radicals within the dispersed polydiorganosiloxane, then adding colloidal silica.

19. The method of claim 18 in which the free radicals are formed within the dispersed polydiorganosiloxane by exposing the dispersion to high energy radiation.

20. The method of claim 18 in which the free radicals are formed within the dispersed polydiorganosiloxane by the combined action of heat and a free radical-producing agent.

21. The method of claim 18 in which the polydiorganosiloxane is a copolymer containing dimethylsiloxane units and methylvinylsiloxane units, the copolymer having a weight average molecular weight of 200,000 to 700,000.

22. The method of claim 6 in which the emulsion (1) is a continuous aqueous phase and a dispersed phase, the dispersed phase consisting essentially of an anionically stabilized hydroxylated polydiorganosiloxane which contains about 2 silicon-bonded hydroxyl radicals per molecule, an organic tin compound, and a colloidal silica, said silicone emulsion having a pH in a range of 9 to 11.5 inclusive.

23. The method of claim 10 in which the emulsion (1) is a continuous aqueous phase and a dispersed phase, the dispersed phase consisting essentially of an anionically stabilized hydroxylated polydiorganosiloxane which contains about 2 silicon-bonded hydroxyl radicals per molecule, an organic tin compound, and a colloidal silica, said silicone emulsion having a pH in a range of 9 to 11.5 inclusive.

* * * * *

UNITED STATES PATENT AND TRADEMARK OFFICE
CERTIFICATE OF CORRECTION

PATENT NO. : 4,572,917

DATED : February 25, 1986

INVENTOR(S) : Daniel Graiver and Robert Kalinowski

It is certified that error appears in the above-identified patent and that said Letters Patent is hereby corrected as shown below:

In the Title; "WEAR" should read "WATER".

Column 1, line 1, title; "WEAR" should read "WATER".

Signed and Sealed this

Twenty-third Day of September 1986

[SEAL]

Attest:

DONALD J. QUIGG

Attesting Officer

Commissioner of Patents and Trademarks